United States Patent
Domínguez López et al.

(10) Patent No.: US 9,806,805 B2
(45) Date of Patent: Oct. 31, 2017

(54) DISTRIBUTED FIBER OPTIC SENSING SYSTEM AND METHOD BASED ON STIMULATED BRILLOUIN SCATTERING

(71) Applicant: UNIVERSIDAD DE ALCALÁ, Alcalá de Henares (Madrid) (ES)

(72) Inventors: Alejandro Domínguez López, Alcalá de Henares (ES); Alexia López Gil, Alcalá de Henares (ES); Sonia Martín López, Alcalá de Henares (ES); Miguel Herráez, Alcalá de Henares (ES)

(73) Assignee: UNIVERSIDAD DE ALCALÁ, Alcalá de Henares (Madrid) (ES)

( * ) Notice: Subject to any disclaimer, the term of this patent is extended or adjusted under 35 U.S.C. 154(b) by 0 days.

(21) Appl. No.: 14/902,819

(22) PCT Filed: Jul. 3, 2014

(86) PCT No.: PCT/ES2014/070540
§ 371 (c)(1),
(2) Date: Jan. 4, 2016

(87) PCT Pub. No.: WO2015/001162
PCT Pub. Date: Jan. 8, 2015

(65) Prior Publication Data
US 2016/0182149 A1 Jun. 23, 2016

(30) Foreign Application Priority Data

Jul. 5, 2013 (ES) .................................. 201331017

(51) Int. Cl.
*H04B 10/08* (2006.01)
*H04B 10/079* (2013.01)
(Continued)

(52) U.S. Cl.
CPC .... *H04B 10/07955* (2013.01); *G01D 5/35364* (2013.01); *H04B 10/071* (2013.01); *H04B 10/0797* (2013.01)

(58) Field of Classification Search
CPC ............ H04B 10/07955; H04B 10/071; H04B 10/0797; H04B 10/07953; H04B 10/0795;
(Continued)

(56) References Cited

U.S. PATENT DOCUMENTS 6,771,360 B2 * 8/2004 Kawabata ............ G01M 11/338
356/73.1
6,806,996 B2 * 10/2004 Tatsuura ................ B82Y 20/00
359/298

(Continued)

FOREIGN PATENT DOCUMENTS

| CN | 102147236 | 8/2011 |
|---|---|---|
| CN | 102759371 | 10/2012 |
| EP | 1760424 | 3/2007 |

OTHER PUBLICATIONS

Kilometers-Range Dark-Pulse Brillouin Optical Time Domain Analyzer with Centimeters Spatial Resolution. Lei et al.(Lei Liu, Zhiguo Zhang, Xue Chen, Min Zhang; 2010.*

(Continued)

*Primary Examiner* — Hibret Woldekidan
(74) *Attorney, Agent, or Firm* — Blakely Sokoloff Taylor & Zafman LLP

(57) ABSTRACT

System and method of distributed sensing based on Brillouin stimulated scattering on optical fiber (3), consisting of separating the two signals of which the probe signal is composed and obtaining the difference between the stimulated amplification band (8) and the attenuation band (9), or vice-versa. In this way a signal is obtained with greater amplitude than in the case of detection being performed with a single band. Thus the signal-to-noise ratio is improved in (Continued)

the sensor signal, dynamic range and the range is increased and the uncertainty of the measurement is decreased. It also eliminates the common noise present in the two bands of the probe signal and, in the case of using a balanced detector in detection, it improves the saturation characteristics of the detector, being able to achieve much larger signal amplitudes than in the conventional case.

12 Claims, 4 Drawing Sheets

(51) Int. Cl.
    *G01D 5/353*     (2006.01)
    *H04B 10/071*     (2013.01)

(58) Field of Classification Search
    CPC .. H04B 10/0773; H04B 10/0799; H04B 3/46; G01J 11/00; G01D 5/35364; G01M 11/319; G01M 11/083; G01M 11/3109; G01M 11/085
    USPC ......... 398/16, 25, 28, 38, 79, 152, 157, 205, 398/184
    See application file for complete search history.

(56) References Cited

U.S. PATENT DOCUMENTS

| | | | | |
|---|---|---|---|---|
| 6,947,129 | B1 * | 9/2005 | Lu | G01M 11/336 356/73.1 |
| 8,982,340 | B2 * | 3/2015 | Peled | G01M 11/3172 356/73.1 |
| 9,065,243 | B2 * | 6/2015 | Asobe | G02F 1/39 |
| 9,410,826 | B2 * | 8/2016 | Bastianini | G01D 5/35364 |
| 2010/0284000 | A1 * | 11/2010 | Xu | G01F 23/22 356/301 |
| 2011/0151291 | A1 * | 6/2011 | Hoffman | H01M 12/02 429/50 |
| 2012/0239013 | A1 * | 9/2012 | Islam | H01S 5/0064 606/3 |
| 2012/0274927 | A1 * | 11/2012 | Li | G01L 1/246 356/73.1 |
| 2013/0229649 | A1 | 9/2013 | Li et al. | |
| 2013/0279912 | A1 * | 10/2013 | Lyubomirsky | H04J 14/06 398/65 |
| 2014/0306101 | A1 * | 10/2014 | Zornoza Indart | G01D 5/35364 250/227.14 |
| 2016/0327436 | A1 * | 11/2016 | Tur | G01K 11/32 |

OTHER PUBLICATIONS

PCT Search Report and Written Opinion dated Oct. 1, 2014, PCT/ES2014/070540, 13 pages.

Dominguez-Lopez, A., et al., "Balanced detection in Brillouin optical time domain analysis", *Proc. SPIE 9157, International Conference on Optical Fibre Sensors*, 915765, (Jun. 2, 2014), 4 pages.

Dominguez-Lopez, A., et al., "Signal-to-Noise Ratio Improvement in BOTDA Using Balanced Detection", *IEEE Photonics Technology Letters*, vol. 26, No. 4, (Feb. 15, 2014), 338-341.

Li, L , et al., "Kilometers-Range Dark-Pulse Brillouin Optical Time Domain Analyzer with Centimeters Spatial Resolution", *Symposium on Photonics and Optoelectronics (SOPO 2010)*, Chengdu, China, (2010), 4 pages.

* cited by examiner

DISTRIBUTED FIBER OPTIC SENSING SYSTEM AND METHOD BASED ON STIMULATED BRILLOUIN SCATTERING

CROSS-REFERENCE TO RELATED APPLICATIONS

The present patent application is a national phase application of International Application No. PCT/ES2014/070540, filed Jul. 3, 2014, which claims priority to Spanish Application No. P201331017, filed Jul. 5, 2013, the disclosures of which are incorporated herein by reference.

OBJECT OF THE INVENTION

The present invention belongs to the sector of physical technologies, being applied to measurement systems based on distributed sensors on optical fiber.

BACKGROUND OF THE INVENTION

Distributed sensors are an attractive and promising technique for monitoring parameters such as deformation and temperatures at long distances. Distributed fiber optic sensors are based on a modulation of the intensity or the frequency of the light introduced in the fiber and a synchronous detection so that we can determine the position in which the disturbance occurs. In general, any fracture or damage in the structure gives rise to a variation in the light intensity which is transmitted throughout the fiber. Within this type of sensors we can highlight sensors based on linear backscatter techniques and those based on non-linear effects such as Brillouin scattering and Raman scattering. In recent years, those based on Raman and Brillouin scattering have experienced a growing application in the instrumentation of all type of civil infrastructures (bridges, tunnels, buildings, dams), transport infrastructures (aeroplanes, railway lines, . . . ), industrial and energy infrastructures (gas and water pipelines, oil platforms, . . . ).

The Brillouin effect is a stimulated acoustic-optical interaction which is produced very efficiently in optical fibers. In simple terms, the Brillouin effect is obtained when laser light is introduced (spectrally narrow and sufficiently powerful) in an optical fiber. For the purposes of notation, we can assume that it is centred on an optical frequency $f_0$. The presence of this light induces a gain on a light beam which is propagated in the opposite direction, to the frequency $f_0-v_B$. In this way, an attenuation is induced on a light beam which is propagated in opposite direction to the frequency $f_0+v_B$. The parameter $v_B$ is called Brillouin displacement and is sensitive to changes in temperature or deformation of the fiber. This fact is used for the distributed detection of changes in temperature and deformations.

Based on this physical phenomenon, different sensing techniques have been developed over the years, among which we can cite: BOTDA (Brillouin Optical Time Domain Analyzer); BOFDA (Brillouin Optical Frequency Domain Analyzer) and BOCDA (Brillouin Optical Correlation Domain Analysis); BOTDA or BOFDA with Raman assistance of any order and any configuration; V-BOTDA (Vectorial Brillouin Optical Time Domain Analyzer), wherein the probe and/or pump is modulated in some way; Coded-BOTDA; differential pump-width BOTDA (DPP_BOTDA); etc.; as well as any of these possible combinations.

In BOTDA sensors, and their variants, one or several pulses (in the case of coded-BOTDA, for example) and a continuous signal (modulated or not) counterpropagating to it are sent through the fiber to obtain the Brillouin frequency. To obtain the parameter $v_B$, the frequency difference is analysed between the pulse sent and the continuous wave when the amplification of the counterpropagating continuous wave is maximized. To do this it is necessary to perform a frequency sweep. As the light is pulsed, the amplification recorded in the time domain shall also depend on the position at which the pulse is in at each instant. With this, it is possible to trace a Brillouin displacement map in accordance with distance. The Brillouin displacement variations can be related to temperature or deformation variations.

The case of the BOFDA sensors and their variants is differentiated from the above in that instead of a pulse an amplitude-modulated signal is sent through the fiber, with a variable frequency. To perform each measurement, a frequency sweep of the probe signal is necessary, in addition to a sweep in the modulation of the pump signal.

The sensors based on BOCDA technology and their possible variants make use of the fact that the stimulated Brillouin scattering depends on the correlation between the two waves which generate it and the efficiency of the process lowers sharply due to changes in frequency, phase or polarization. In short, the operation of the BOCDA is based in the artificial reduction of the correlation, by means of intelligent modulation, between the waves that generate stimulated Brillouin scattering at any point of the fiber, except at the point of study.

In the case of BOTDA and BOFDA-based sensors, there is an insurmountable and inherent limitation to the optical fiber which is the attenuation that the light undergoes on being propagated through it. The measurement length range that all these systems have is close to from a dozen meters to around fifty kilometers.

In the case of the BOCDA, the signals obtained are generally weak and it is convenient to have strategies to improve the SNR (Signal to Noise Ratio).

In all the systems mentioned above, the detection is performed at the end from which the pump is launched. For this, a photodetector is used to detect the probe signal in accordance with the flight time of the pump signal in the fiber. Normally, the probe signal is composed of two frequencies (one at $f_0+v_B$ and another at $f_0-v_B$), with $v_B$ being the difference in frequency between pump and probe. The conventional systems isolate and/or filter in detection one of two frequencies which compose the wave and detect it with a single photodetector, obtaining gain or attenuation signals in accordance with the chosen band.

For all the distributed sensing systems based on stimulated Brillouin scattering described, there is in the state of the art the need to improve the dynamic range and the signal to noise ratio of the measurements, making it possible to achieve greater sensing lengths, maintaining the resolution.

DESCRIPTION OF THE INVENTION

The present invention resolves all the previous problems by means of a sensing system and sensing method which implements any of said techniques based on Brillouin stimulated scattering (BOTDA, BOFDA and BOCDA-type systems including their variants such as, for example, Raman assistance of any order or the vectorial variant thereof, etc.) by means of a differential detection of the amplified and attenuated bands.

In a first aspect of the invention, there is a distributed sensing system comprising:
Light emission means adapted to emit the probe and pump signals in the fiber.

Discrimination means adapted to separate the two signals corresponding to the amplified band and to the attenuated band throughout the optical fiber object of monitoring.

Detection means adapted to obtaining the difference between the stimulated amplification band and the attenuation band, or vice-versa.

Analysis means, adapted to implement the distributed sensing technique based on Brillouin scattering using the differential measurement of the stimulated amplification band and the attenuation band, instead of the measurement of a single band as occurs in traditional systems.

Two preferential options are contemplated for the discrimination:

a frequency discrimination device.

A polarization discrimination device. In this case, the system preferably comprises specific means to control the polarization of the probe signal, thus ensuring that the amplified band and the attenuated band have orthogonal polarizations.

Once the two signals have been separated (amplified band and attenuated band) so that they can be analysed independently, two preferred options are contemplated for the detection means:

A balanced detector: by means of a transimpedance amplifier, a voltage is obtained proportional to the difference in photocurrents measured by two photodiodes when two optical signals corresponding to the stimulated amplification band and to the stimulated attenuation band are connected to their inputs.

Two single detectors (photoreceptors): each detector has one of the bands (amplification and attenuation) at its input. Later, an electronic or logical element obtains the difference of the outputs of the two detectors or an equivalent process which improves the signal to noise ratio.

In a second aspect of the invention, it has a distributed sensing method comprising separating the two signals corresponding to the amplified band and to the attenuated band throughout the fiber optic object of monitoring. Then, the difference is obtained between the stimulated amplification band and the attenuation band, or vice-versa. The method of the invention may also comprise the preferred characteristics described for the system of the invention.

In this way, a signal is obtained with greater amplitude than in the case of performing detection with a single band. With this increase in amplitude we improve the signal to noise ratio in the sensor signal, improving the dynamic range and, therefore, increasing the range as well as decreasing the uncertainty of the measurement. This configuration has two more added advantages: first, it eliminates the common noise present in the two bands of the probe signal. Second, in the case of using a balanced detector in detection, it improves the saturation characteristics of the detector, being able to achieve much greater signal amplitudes than in the case of conventional detection. These and other advantages of the invention shall be apparent in light of detailed description thereof.

DESCRIPTION OF THE DRAWINGS

To complement the description being made, and in order to aid towards a better understanding of the characteristics of the invention, in accordance with a preferred example of practical embodiment thereof, a set of drawings is attached as an integral part of said description, wherein the following has been represented with an illustrative and non-limiting character.

PREFERRED EMBODIMENT OF THE INVENTION

In this text, the term "comprises" and its derivatives (such as "comprising, etc.) should not be interpreted in exclusive sense. In other words, these terms must not be interpreted as exclusive of the possibility that what is described and defined may include more elements, stages, etc.

The detection system proposed for the improvement of the dynamic range and the increase in measurement range is applied to any Brillouin fiber optic distributed sensor whose measurement technology is based on BOTDA, BOFDA or BOCDA systems as well as any of their variants (Vectorial-BOTDA/BOFDA, Raman Assisted-BOTDA/BOFDA or others).

Furthermore, the invention is not limited to the specific embodiments described, but they also include, for example, the variants that can be made by a person skilled in the art (for example, as regards choice of materials, dimensions, components, configuration, etc.), as gathered from the claims.

Figure 1:
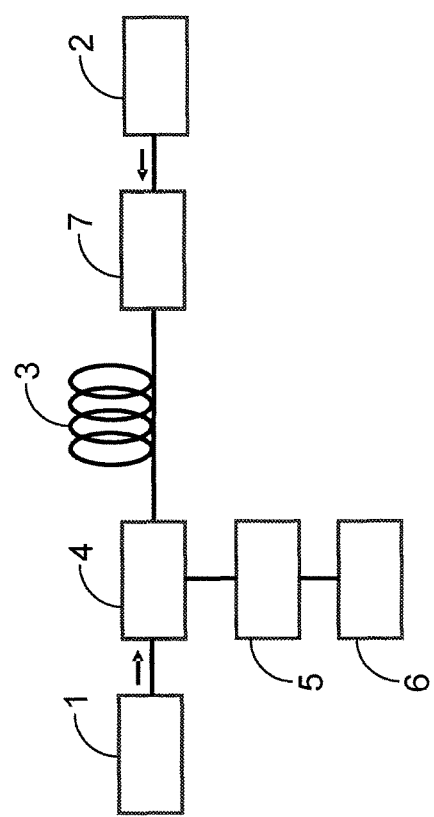
FIG. 1 shows a diagram of a distributed sensing system based on Brillouin scattering in accordance with a particular implementation of the invention.

FIG. 1 shows a distributed differential sensing system according to a particular embodiment of the invention, whose elements implement in turn a particular embodiment of the method of the invention. The system comprises first light emission means 1 and second light emission means 2 adapted to introduce the probe and pump signals in an optical fiber 3 through an input/output port 4 and an input port 7 respectively. Connected to the input/output port 4, means of discrimination 5 separate the two stimulated bands of the probe signal before its detection in the detection means 6.

Figure 2:
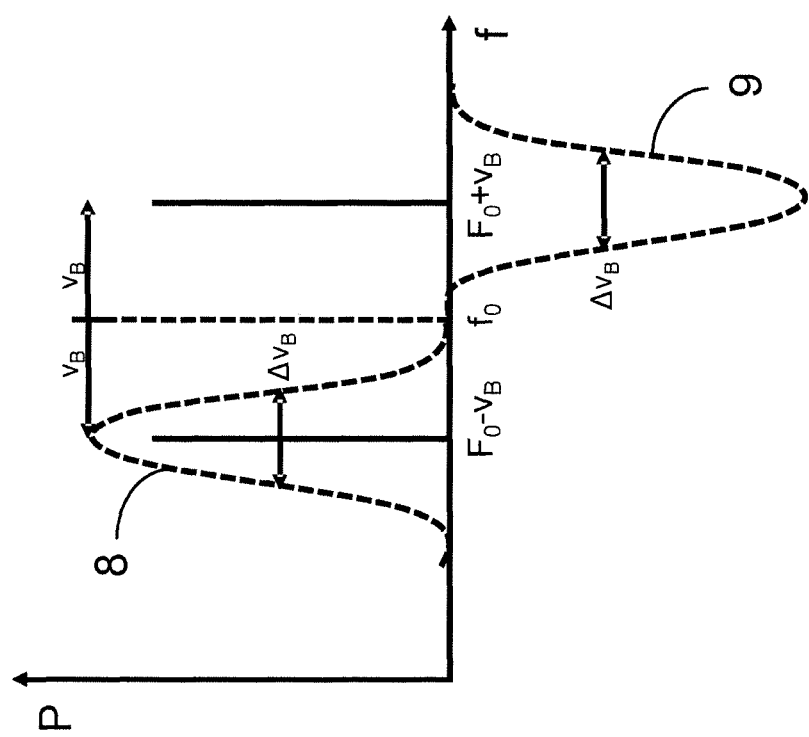
FIG. 2 shows a spectral diagram characteristic of a distributed sensing system based on Brillouin scattering.

All the systems based on distributed sensing techniques by means of Brillouin scattering have a frequency signal diagram such as that represented in FIG. 2, wherein on both sides of the pump signal (generated by the first light emission means 1) whereby Brillouin scattering is generated, two signals are generated counterpropagating to it (generated by the second light emission means 2) represented in continuous line in FIG. 2. These two counterpropagating signals must be equally spaced with respect to the pump signal in the optical spectrum. When these signals are separated from the pump, a frequency close to $v_B$ and within the Brillouin gain or attenuation band generated by pumping, they experience a gain or attenuation in their amplitude on being propagated by the optical fiber 3 under testing together with the pump signal. The result of these simultaneous amplification and attenuation processes is extracted from the natural line of light propagation by means of the input/output port 4. This input/output port 4 may be designed and manufactured both in optical fiber technology and in any other technology. Next, in the discrimination means 5 and detection means 6, all the processes and actions take place necessary to obtain, from these two signals (attenuated and amplified by stimulated Brillouin scattering), the signal resulting from the monitoring of the optical fiber 3 under testing, said monitoring signal being based on the power difference detected between the attenuated band and the amplified band.

Figure 3:
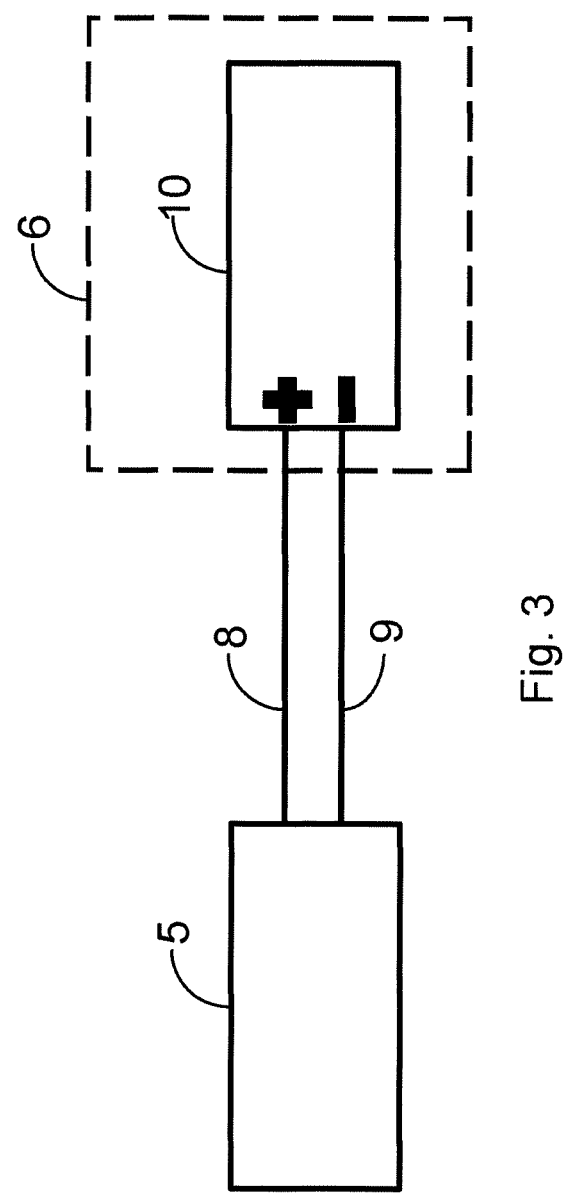
FIG. 3 shows in detail a particular implementation of the detection means based on a balanced detector.

FIG. 3 has a first implementation of the detection means 6, based on a balanced detector 10, which receives as inputs the amplified band 8 and the attenuated band 9, generating a signal proportional to the power difference between both bands.

Figure 4:
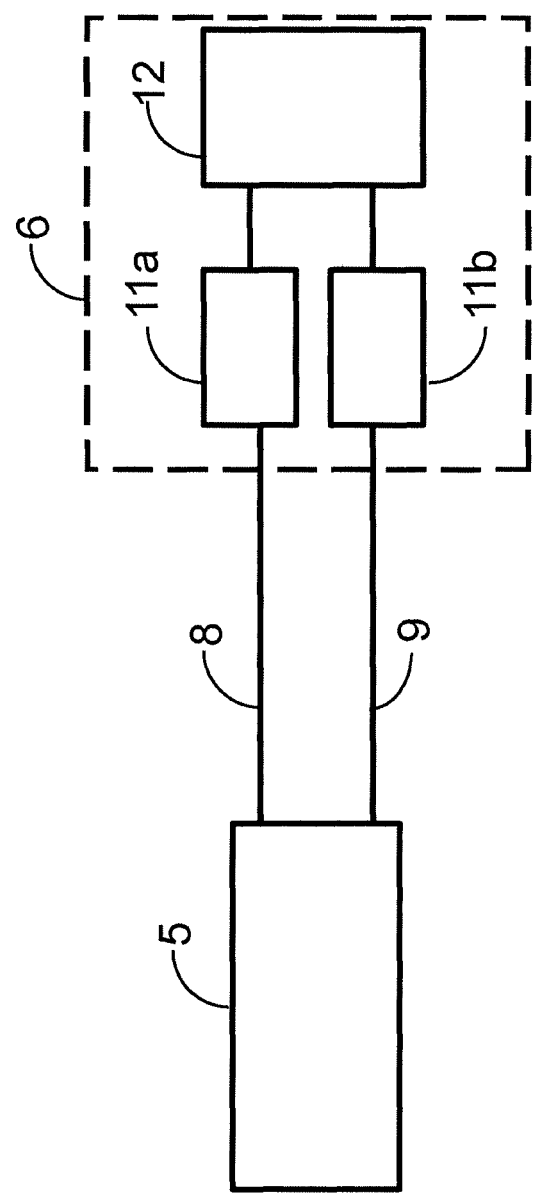
FIG. 4 shows in detail a particular implementation of the detection means based on two photoreceptors.

Likewise, FIG. 4 shows a second implementation of the detection means 6, based on two independent photoreceptors. The first photoreceptor 11a detects the power of the amplified band 8, whilst the second photoreceptor 11b detects the signal of the attenuated band 9. Subtraction means 12 generate the signal proportional to the power difference between both bands. The subtraction means 12 may act electronically, optically, on a software level, etc.

Below, some particular implementations are detailed of the system and method of the invention applied to different sensing techniques:
 a) For a BOTDA system:
  i) Two or more light signals are used: pump signal (emitted in pulsing basis in the first emission means 1) and probe or probes (emitted by the second emission means 2). The pump signal and the probe signal or signals are introduced in the sensor optical fiber 3 in counterpropagating direction, with said fiber optic 3 being deployed throughout the element object of sensing. Both signals are introduced in the fiber, respectively, through an insertion/extraction system 4, for example a circulator, and an insertion system 7, for example a splitter.
   A spectral discrimination optical filter is used as discrimination means 5, whereby the bands of interest are separated, which have symmetrical frequencies with respect to the central pump frequency.
   Subsequently, the difference is calculated in the detection means 6 between the amplitude of both bands by means of a balanced detector 10 or single detectors 11 in combination with electronic, electro-optical, optical or software elements, thus obtaining a greater power than with a single band.
  ii) As in embodiment (i) but separating the amplified 8 and attenuated 9 probe signals by means of elements sensitive to polarization. For this, it will be necessary that the two bands of the probe signal have orthogonal polarizations, so that the light generation means wherein the probe signal is generated comprise means of polarization control which guarantee compliance with this condition. With respect to embodiment (i), the spectral discrimination filter is replaced by a polarization discrimination filter.
  iii) As in embodiment (i) and (ii), combining the two types of filters (polarization and frequency).
 b) For a BOFDA system, identical to embodiment (a), only in this case the pump is modulated instead of pulsing.
 c) For a BOCDA system, identical to embodiment (a), but in this case there is a frequency modulation both in the pump and the probe.

The invention claimed is:

1. A system of distributed sensing on an optical fiber based on stimulated Brillouin scattering comprising:
 light emission means adapted to be connected to the optical fiber by means of an input/output port and an input port, and to generate a pump signal and a probe signal adapted to generate the effect of stimulated Brillouin scattering in the optical fiber;
 discrimination means coupled to the input/output port and adapted to separate an amplified band and an attenuated band generated by the Brillouin scattering;
 a balanced detector coupled to the discrimination means and adapted to detect a power difference between the amplified band and the attenuated band; and
 analysis means adapted to calculate the distributed sensing from the power difference detected, wherein the light emission means further comprises polarization control means adapted to control the polarization of the probe signal so that the amplified band and the attenuated band have orthogonal polarizations.

2. The system of claim 1, wherein the pump signal comprises at least one light pulse.

3. The system of claim 1, wherein the pump signal comprises at least one pulse with a peak power greater than a background power of said pump signal.

4. The system of claim 1, wherein it implements a technique based on Brillouin scattering selected from among the following: Brillouin optical frequency domain reflectometry, Brillouin optical correlation domain reflectometry, Brillouin optical vectorial time domain reflectometry, Brillouin optical vectorial time domain reflectometry, Brillouin optical vectorial time domain reflectometry with pulse coding, Brillouin optical vectorial time domain reflectometry in different pulse widths and any combination of the above.

5. The system of claim 1, wherein the discrimination means is a frequency discrimination means.

6. The system of claim 1, wherein the discrimination means is a polarization discrimination means.

7. A method of distributed sensing on an optical fiber based on stimulated Brillouin scattering comprising:
 generating a pump signal and a probe signal adapted to generate the effect of stimulated Brillouin scattering in the optical fiber;
 separating an amplified band and an attenuated band generated by the Brillouin scattering;
 detecting a power difference between the amplified band and the attenuated band by means of a balanced detector; and
 calculating the distributed sensing from the power difference detected,
further comprising:
 controlling the polarization of the probe signal so that the amplified band and the attenuated band have orthogonal polarizations.

8. The method of claim 7, wherein the pump signal comprises at least one light pulse.

9. The method of claim 7, wherein the pump signal comprises at least one pulse with a peak power greater than a background power of said pump signal.

10. The method of claim 7, wherein it implements a technique based on Brillouin scattering selected from among the following: Brillouin optical frequency domain reflectometry, Brillouin optical correlation domain reflectometry, Brillouin optical vectorial time domain reflectometry, Brillouin optical vectorial time domain reflectometry, Brillouin optical vectorial time domain reflectometry with pulse coding, Brillouin optical vectorial time domain reflectometry in different pulse widths and any combination of the above.

11. The method of claim 7, wherein the step of separating the amplified band and the attenuated band comprises discriminating in frequency said amplified band and attenuated band.

12. The method of claim 7, wherein the step of separating the amplified band and the attenuated band comprises discriminating in polarization said amplified band and attenuated band.

* * * * *